United States Patent [19]

Swenson

[11] 4,410,169

[45] Oct. 18, 1983

[54] WORK-HOLDING CLAMP WITH DOUBLE-ACTING HYDRAULICALLY ACTUATED JAW

[75] Inventor: Kurt F. Swenson, Newton, N.J.

[73] Assignee: J & S Tool Company, Inc., Livingston, N.J.

[21] Appl. No.: 323,040

[22] Filed: Nov. 19, 1981

[51] Int. Cl.$^3$ .............................................. B23Q 3/02

[52] U.S. Cl. ....................................... 269/32; 269/138

[58] Field of Search ............... 269/134, 136, 137, 138, 269/32

[56] References Cited

U.S. PATENT DOCUMENTS

| | | | |
|---|---|---|---|
| 2,637,249 | 5/1953 | Swenson | 269/134 |
| 2,667,799 | 2/1954 | Rzepela | 269/138 |
| 3,595,112 | 7/1971 | DeGeorge | 269/137 |
| 3,603,579 | 9/1971 | Odom | 269/32 |
| 4,223,879 | 9/1980 | Wolf | 269/32 |
| 4,365,792 | 12/1982 | Johns | 269/32 |

*Primary Examiner*—Robert C. Watson
*Attorney, Agent, or Firm*—Ralph R. Roberts

[57] ABSTRACT

A work-holding clamp retains a work piece on a machine tool table and includes a body member having a flat supporting surface and the means to secure the body member to a work table. This body member is made with a stepped bore formed therein and therethrough. The forward end of the body member has a formed dovetail in which moves a jaw member at a selected slant or slope. Within this body member is a reciprocal hydraulic piston having its forward end formed with two cam surfaces. A lower cam surface is adapted to engage a mating cam surface on the jaw to move the jaw member forwardly and downwardly to a gripping condition. An actuation of the piston rearwardly causes an upper cam surface to engage a removable pin to move the jaw member upwardly and rearwardly to disengage the jaw member from the workpiece. This piston is carried in the stepped bore with the rear of the piston being a sliding fit in the larger portion of the bore. An inlet for pressurized air or fluid is formed in the stepped bore adjacent to the fixed seal and inflow of pressurized air or fluid causes rearward movement of the piston. This piston is provided with an integral threaded portion in which is mounted a removable screw or bolt that permits manipulative rotation of the piston.

16 Claims, 17 Drawing Figures

WORK-HOLDING CLAMP WITH DOUBLE-ACTING HYDRAULICALLY ACTUATED JAW

BACKGROUND OF THE INVENTION

1. Field of the Invention

A work-holding hydraulically actuated clamp which has a projecting forward end. This forward end is formed with two cam surfaces which actuate an inclined jaw slidably carried in and by a dovetail. This piston is reciprocably moved and forwardly moves the jaw forward and down and a reverse motion of the piston causes the jaw to raise and move rearward.

2. Description of the Prior Art

Work-holding clamps are well known in the art and are widely used for holding work that has to be machined in and by metal working equipment. In particular, work-holders having inclined jaws are well known and are shown in U.S. Pat. No. 2,637,249 to H. SWENSON as issued on May 5, 1953. A clamp or vise is also seen in the patent to RZEPELA, U.S. Pat. No. 2,667,799 as issued on Feb. 2, 1954. A more recent machine tool clamp assembly is seen in U.S. Pat. No. 3,595,112 to DeGEORGE as issued on July 27, 1971.

Hydraulic action for clamping is also known but in the present invention the ram is moved by pressurized fluid to and fro or in and out and the forward end is especially contoured to not only provide a forward and downward clamping actuation but the withdrawal motion causes this ram to engage the jaw clamp end to move it up and away from the held work. Fluid actuation is seen in U.S. Pat. No. 3,603,579 as issued to ODOM on Sept. 7, 1971. In the prior art devices shown by domestic and foreign patents a holding clamp with hydraulic actuation for applying holding and withdrawing pressure by a piston is not shown or known to Applicant. In a reduced-to-practice clamp in a small size as shown in the drawings the jaw movement is approximately one-quarter inch with a clamping force of about thirty-five hundred pounds. The hydraulic pressure is anticipated to be about thirty-five hundred p.s.i. This hydraulic clamp, while offering a low profile, provides a positive holding action and a positive unclamping in and to its return action.

SUMMARY OF THE INVENTION

This invention may be summarized in brief with reference to its objects. It is an object of this invention to provide, and it does provide, a work-holding clamp in which hydraulic pressure is used to move a double-acting piston. A jaw member is movable by this piston down an inclined ramp to not only grip but to provide a "hold down" actuation of the work piece. The body is adapted to be retained on a work table by means of hold down screws. The jaw is moved by a piston contained within this body.

It is an object of this invention to provide, and it does provide, a work-holding clamp actuated by hydraulic pressure which has a built-in double-acting piston providing a powerful forward and downward clamping force. This jaw in its forward motion grips and holds the work piece and by hydraulic pressure this piston moves rearwardly the jaw to provide an unclamping return. The jaw has a serrated nose to provide a secure gripping of the work piece. The piston has an exterior inclined ramp along which the movable jaw is moved up and down. The piston also has an inclined inner shoulder engaged by the rounded mounted end of a screw to provide the positive unclamping action of the movable jaw.

In brief, this double-acting hydraulic work-holding clamp provides a body having a precise bore for the movement of the piston therein and also a forward bore for the exit of a cam end of the piston. The forward end of this body is provided with an inclined dovetailed groove to retain a compatibly formed jaw. This jaw has its forward end formed with a serrated nose and carries a round ended screw which engages the upper cam surface of the movable piston. This movable piston has its inner cam slope formed by a ball and mill so that a resulting half-round track is adapted to be engaged by a like-shaped rounded end of a cap screw. This same slope provides substantial sidewall portions for the retaining of the cam track and also to provide a strengthened outer angled cam surface on the forward end of this piston. Provision is made for the grinding on centers of the piston after heat treatment. The shaping of the dovetail grooves is also contemplated and provided. The rear end closure of the piston bore is provided with a plug having a scalloped recess at the edge to provide a retention of the plug. It is also to be noted that the hydraulic actuated work-holding clamp not only provides a low profile for retention of a work piece but also provides components that can be made to very precise dimensions for easy repair and for replacement.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen a specific embodiment of a work-holding clamp with double-acting hydraulically actuated jaw as adopted for use in holding work pieces to a work table and showing a preferred means of construction and assembly. This specific embodiment has been chosen for the purposes of illustration and description as shown in the accompanying drawings wherein:

BRIEF DESCRIPTION OF THE DRAWINGS

In the following description and in the claims various details are identified by specific names for convenience. These names are intended to be generic in their application. Corresponding reference characters refer to like members throughout the several figures of the drawings.

DETAILED DESCRIPTION OF THE EMBODIMENT

The three sheets of drawings and the seventeen figures thereof represents a preferred embodiment of a hydraulic work-holding clamp utilizing and employing a built-in double-acting piston. The drawings have been shown substantially full size to show the concept of a small work-holding clamp but the hydraulic work-holding clamp may be made as and in larger and smaller sizes if desired.

Figure 2:
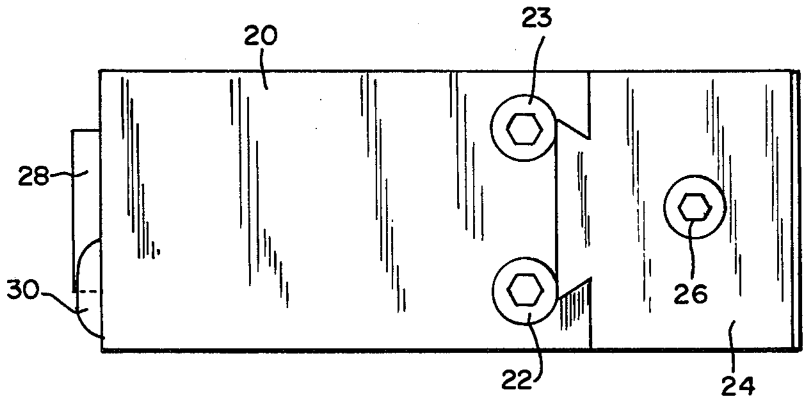
FIG. 2 represents a plan view looking down on the clamp of FIG. 1, this view taken on the line 2—2 thereof and looking in the direction of the arrows.
Figure 1:
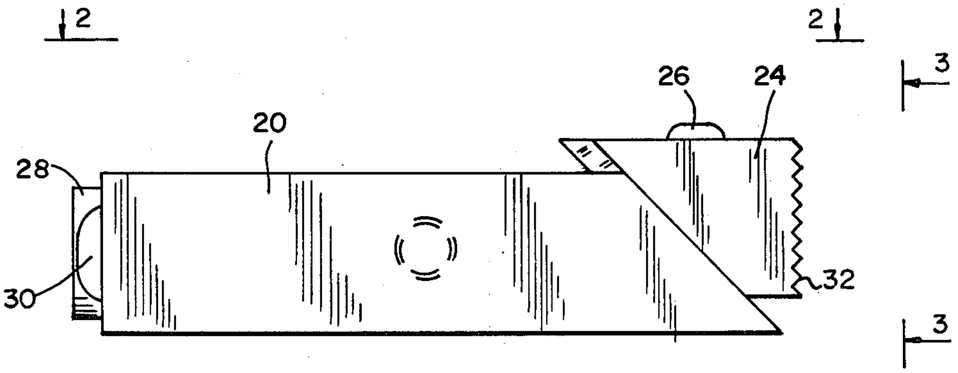
FIG. 1 represents a side view of the double-acting hydraulic work-holding clamp of this invention and showing a movable jaw in the up or non-clamping position.
Figure 3:
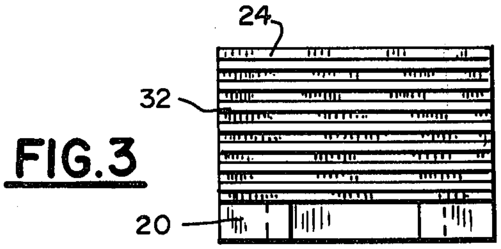
FIG. 3 represents an end view of the clamp of FIG. 1, this view taken on the line 3—3 thereof and looking in the direction of the arrows.

As seen in FIG. 1, a body member 20 is substantially rectangular in shape so as to have a finished base for mounting to a machine work table or the like not shown. It is contemplated that this body member be secured to the machine work table by means of holding screws which enter into T-slot nuts or tapped holes in the machine work table. Diagrammatically shown are hex head cap screws (FIG. 2) which cap screws are indicated as 22 and 23. A movable jaw 24 carries a mounted and round ended cap screw 26 to be hereinafter more fully described. As seen in FIG. 1, a rear plug 28 is retained in place by means of a screw 30. The same identification is used in FIG. 2 to indicate these same components. In FIG. 3 it is to be noted that movable jaw 24 is provided with serrations 32 at the nose or gripping face to provide a secure gripping action of the work piece.

Figure 4:
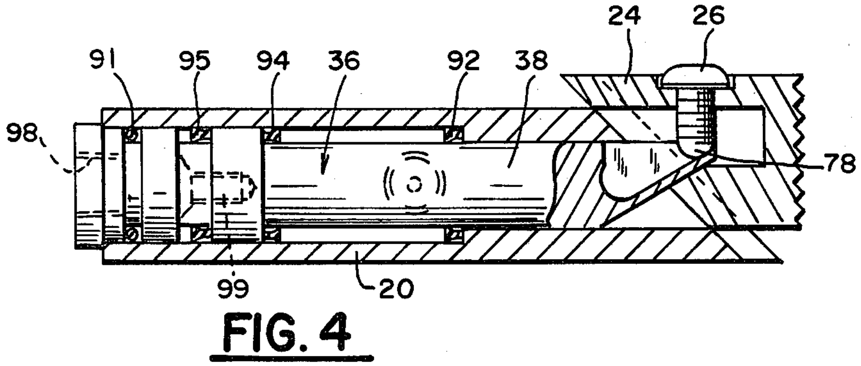
FIG. 4 represents a sectional side view, partly diagrammatic and showing the clamp of FIG. 1, this sectional view showing the several internal components used in the double-acting piston and for use with the hydraulic clamp.

Sectional Assembly of FIG. 4

Figure 10:
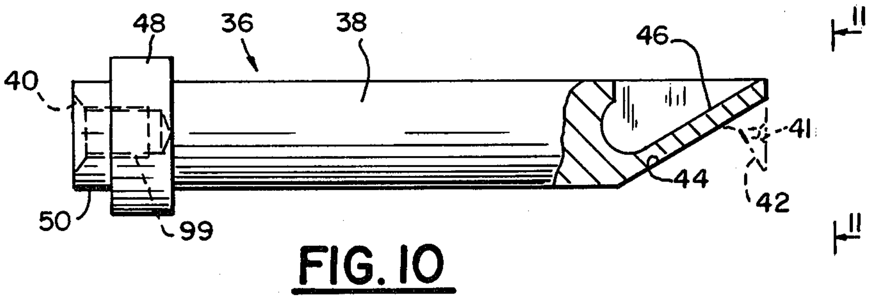
FIG. 10 represents a side view of the piston, this view partly in section to show the construction of the inclined cam surfaces and with a phantom portion formed to provide a forward center for grinding the piston body.

Referring next to the sectional side view as seen in FIG. 4, it is to be noted that the preferred embodiment includes a movable piston generally identified as 36 and shown more fully in FIG. 10. This piston 36 is made of heat treated steel with the outer surface diameter finished as by grinding to provide a precise highly finished surface so as to allow a retention of hydraulic fluid while the piston is moved by and within a precise bore in the body 20. An established forward diameter 38 is ground preferably by means of centers as shown and described hereafter in FIG. 10.

Body of FIGS. 5 through 9

Figure 6:
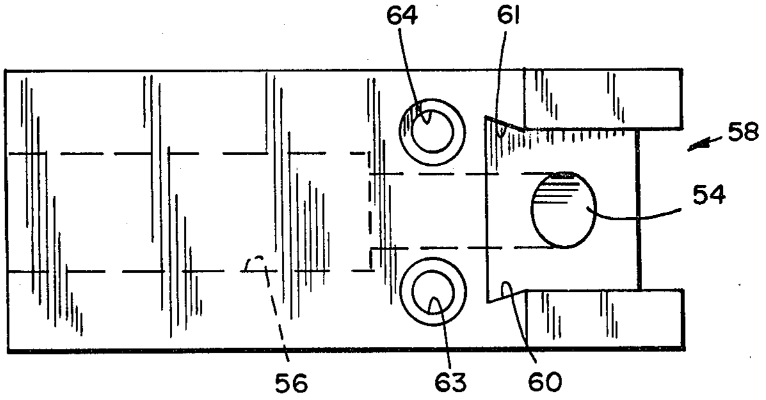
FIG. 6 represents a plan or top view of the work body member as seen in FIG. 5.
Figure 5:
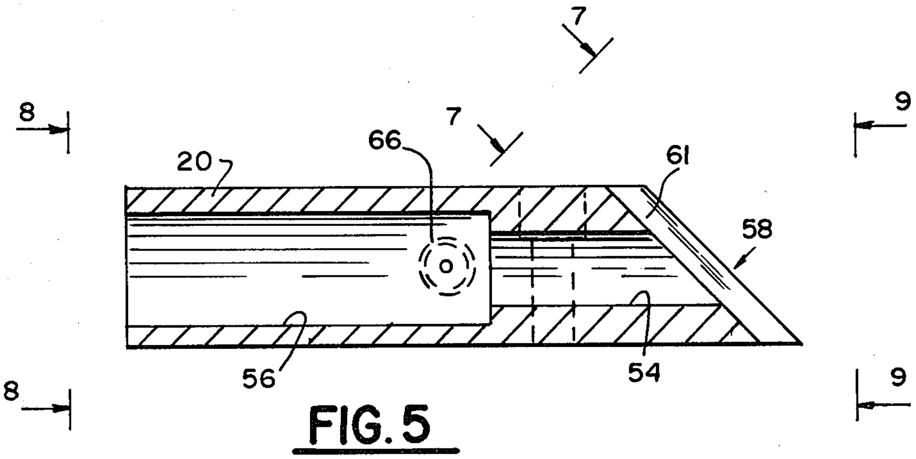
FIG. 5 represents a side sectional view of the body member used for the hydraulic work clamp of FIG. 1.
Figure 8:
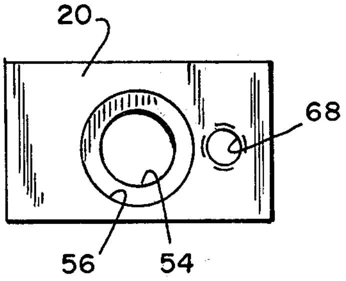
FIG. 8 represents a rear view of the body member of FIG. 5, this view taken on the line 8—8 thereof and looking in the direction of the arrows.
Figure 9:
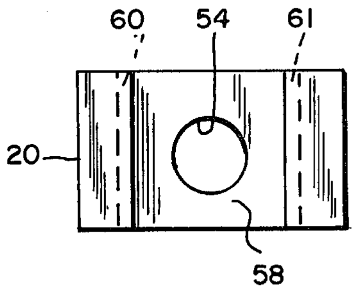
FIG. 9 represents a front view of the body member of FIG. 5, this view taken on the line 9—9 thereof and looking in the direction of the arrows.
Figure 7:
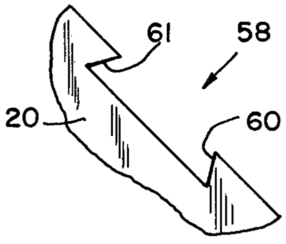
FIG. 7 represents a fragmentary view taken on the line 7—7 of FIG. 5 and showing the female dovetail formed in and at the forward end of the work body member.
Figure 15:
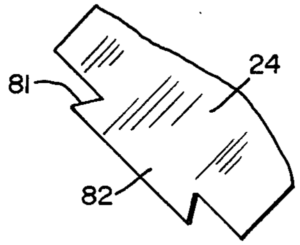
FIG. 15 represents a fragmentary and angled top view of the jaw of FIG. 12 taken on the line 15—15 thereof and showing the male dovetail portion of the movable jaw.
Figure 14:
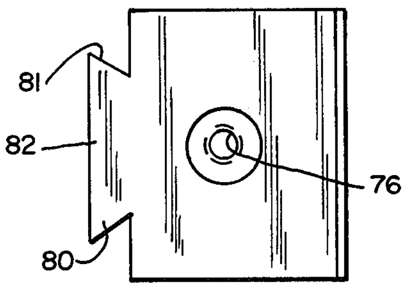
FIG. 14 represents a top or plan view of the jaw of FIG. 12 this view taken on the line 14—14 thereof and looking in the direction of the arrows.
Figure 13:
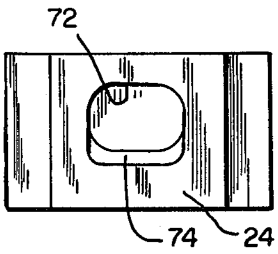
FIG. 13 represents a rear view of the movable jaw, this view taken on the line 13—13 of FIG. 12 and looking in the direction of the arrows.

In cooperation with this piston 36 reference is made to the body 20 shown in FIGS. 5 and 6. In this body is formed a forward bore 54 in which the diameter 38 of the piston 36 is slidably movable and an enlarged bore 56 is formed in the rear portion of the body member 20. The forward portion of this body is formed with a dovetail generally identified as 58 which is formed as female dovetail side members 60 and 61. These dovetails are precisely made and finished and are contemplated to be at substantially forty-five degrees to the support surface of the body but other angles may be selected if desired. Also shown in FIGS. 5 and 6 are counterbored holes 63 and 64 for receiving cap screws 22 and 23 as seen in FIG. 2. As seen in FIG. 5, a pipe tap 66 is formed through the side of the body and into and at the right end of bore 56. A rear view of the body 20 as seen in FIG. 8 shows the body 20 having bore 54 and 56 therein and therethrough and to the right of this bore 56 is a tapped hole 68 in which is mounted the retaining screw 30. Although only one tap hole 68 is shown a like tapped hole may be provided on the other side to retain plug 28 described more fully hereinafter.

Figure 11:
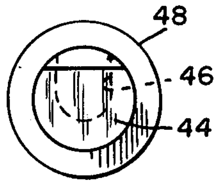
FIG. 11 represents an end view of the piston of FIG. 10 and looking toward the cam surface and with the grinding support removed, this view taken on the line 11—11 thereof and looking in the direction of the arrows.

Piston of FIGS. 10 and 11

In FIG. 10 is shown piston 38 in a finished condition and a preferred manner of making and finishing. Diameters 38, 48 and 50 may be finished by other grinding apparatus but a simplified means is depicted through establishing centers before the finish grinding. A rear tapered center 40 may be formed with a standard countersink. The piston may be initially formed with a center 41 formed in a forward portion 42. On these two centers 40 and 41 the piston is conventionally supported and is rotated as it is ground to finish diameters 38, 48 and 50. After these diameters of the piston are ground to the selected diameter the forward portion 42 shown in phantom outline is removed when the forward end is finished to provide an external flat or planar cam slope 44. The finishing of this slope 44 may include milling and/or grinding and it is to be noted that diameter 38 is preferably finish sized before the forward (right) end portion 42 is removed. In FIG. 11 the surface 44 is shown as generally circular when viewed looking in the direction of the arrows. The slope 44 is short of the right end of the diameter 38 so a horizontal line depicting the termination of the surface 44 corresponds to this end. An interior cam surface 40 is formed in the upper portion of the right end of the piston. This cam surface 46 is formed by and end mill and/or grinder to provide an internal cam ramp which is utilized in a manner to be hereinafter more fully described. As seen in FIG. 11 the cam surface 46 is preferably rounded at the bottom with upwardly substantially parallel sides. The rear portion of this piston 36 is provided with an enlarged diameter portion 48 and to the left thereof is a reduced diameter portion 50 which is formed and provides for the mounting thereon of a piston ring to be hereinafter identified.

Movable Jaw as seen in FIGS. 12, 13, 14 and 15

Figure 12:
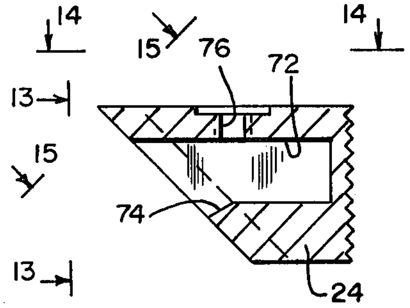
FIG. 12 represents a sectional side view of the movable jaw of this invention.

The movable jaw 24 particularly shown in section in FIG. 12 is formed with a recess 72 which may be formed with and by an end mill before hardening of the jaw. A precise sloped surface 74 is made at an angle to mate with the surface 44 formed on the forward end of piston 36. This surface and the recesses are particularly seen in FIG. 12. Also seen in FIG. 12 is a counterbore and threaded hole 76 for the retention of cap screw 26 having its inner end rounded at 78 as seen in FIG. 4. This front jaw 24 is made with mating dovetails 80 and 81 formed on portion 82. This dovetail is made to match the female dovetail formed and provided on the body 20.

Figure 17:
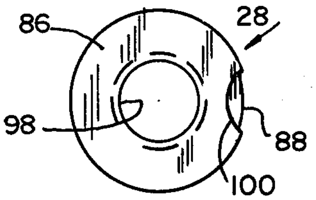
FIG. 17 represents an end view of the rear plug of FIG. 16, this view taken on the line 17—17 thereof and looking in the direction of the arrows.
Figure 16:
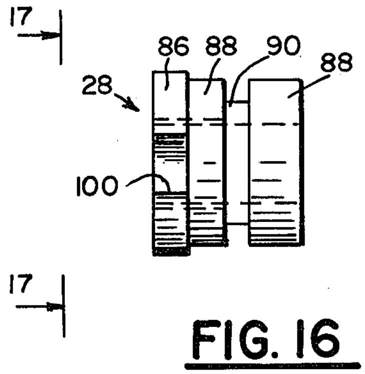
FIG. 16 represents a side view of a plug member used to close the bore of the rear end of the clamp body.

Rear Retaining Plug as seen in FIGS. 16 and 17

In FIGS. 16 and 17 the rear retaining plug generally identified as 28 is made as a round plug and has an outer diameter 86 with inner diameter portions 88 which are a press fit in bore 56. In between these diameters 88 is a groove 90 in which is mounted an O-ring 91 hereinafter to be more fully described.

Referring again to FIG. 4, a seal such as Polypack (TM C. E. Conover, Fairfield, N.J.) may be used for retaining the pressurized fluid in the body and for use to move the piston 36 and also to retain the fluid between the piston and the forward bore 54. Three seals are provided, the forward seal is identified as 92 and is retained within the bore 56 during movement of the piston; two additional seal rings 94 and 95 are movable with the piston 36 and are adapted to contact the bore 56 in the body 20 and when and as the piston is movable therein. An O-ring 91 is mountable in groove 90 in plug 28, and prevents leakage of fluid by pressed in plug 28. This plug is also formed with a pipe tap 98. It is to be noted that the piston 36 is provided and internal and forward of the center 40 by and with a threaded recess 99. This threaded recess is used with a screw for and during the assembly hereinafter more fully described.

Assembly of the Clamp

Referring now to FIG. 4, the assembly of the clamp anticipates the mounting of the fluid retaining seal ring 92 at the forward end of the bore 56 in body 20. On the piston 36 is mounted sliding seal rings 94 and 95 on each side of the outer diameter 48. Prior to the insertion of the piston into the bore a screw or bolt not shown is mounted in the threaded recess 99 of the piston. This screw or bolt provides additional grasping means for the piston. The piston is now pushed forwardly and the extending cam end of the piston is maintained in the partly retracted position so that the jaw 24 may be mounted in and between the dovetails 60 and 61 and slid into a more-or-less desired position. The screw 26 is mounted in the threaded hole 76 and advanced forwardly a short distance. The screw or bolt mounted in the recess 99 of the piston is manipulated so that the piston is rotated and the rounded end of the screw 26 is advanced to lightly engage the upwardly sloped upper semi-circular cam surface 46 formed in the piston 36. The bottom cam slope 44 is adjusted to mate with and slide on cam surface 74 (FIG. 12) of the jaw. Between the cap screw 26 and the jaw 24 the piston is manipulated so as to slidably engage both the lower surface 74 of the jaw 24 and the upper semi-circular cam surface 46 as engaged by the rounded end 78. Adjustment provides a sliding engagement of the cam portions of the piston. The piston is rotated so that the cam surfaces 44 and 74 are in sliding coincidence after which the screw 26 is turned downwardly so that the rounded end 78 of said screw 26 slides on the semi-circular cam surface on the jaw 24.

The plug 28 is lightly pressed into position in the rear of the bore 56. A scallop 100 is aligned so that the head of the screw 30 when tightened is mounted and enters into the scallop. The plug 28 is retained by the head of this screw 30. While one screw 30 is shown an additional tapped hole 68 may be made in the body if desired. A scallop and an additional screw are then used. It is contemplated that the maximum operating pressure will be only thirty-five hundred p.s.i. and the screw 30 is sufficient for the retention of the plug 28.

The several components, except for the seals, are contemplated to be made of steel, hardened or heat treated to a desired degree or amount. Such a clamp has a high degree of serviceability. The piston is moved forwardly by a fluid entering by a pipe mounted on a rear threaded hole 98 in the plug 28. The incoming pressurized fluid through the conduit secured in the plug opening 98 moves piston 36 forwardly or rightwardly from the position as seen in FIG. 4. Cam surface 44 engages surface 74 of the jaw 24 and moves the jaw forwardly and downwardly as guided and directed by the dovetail construction. The maximum jaw movement for the clamp shown is approximately one-quarter of an inch and as seen the clamp body 20 is about one inch in thickness. The threaded inlet 98 for forward actuation and the reverse actuation inlet 66 are contemplated to be a one-eighth pipe tap with an applied hydraulic pressure of about one hundred p.s.i. With such an arrangement it is contemplated that the maximum holding force will be about thirty-five hundred pounds. A forward clamping fluid volume of about one-third of a cubic inch is contemplated and an unclamping volume of about one-half of that amount is also contemplated for the embodiment shown. Although the dovetail depicted is disposed at approximately forty-five degrees this is only a selected angle. The clamping angle of the cam 44 is about twenty to thirty degrees but this is also subject to a designer's selection. The use of different type seals with or without O-ring expansion such as the Polypack above noted is merely a matter of economical and personal selection and other seals may be provided. It is contemplated that the hardened steel members as exposed to use may be ferro treated (blackened) to resist corrosion and all parts heat treated to establish long and useful life.

The piston 36 as shown in FIGS. 10 and 11 depicts an enlarged diameter portion 48 that is slidable in the bore 56 of the body 20. Rings 94 and 95 provide the desired and needed seal of the pressurized fluid in the bore. Any forward leak past these seals is withdrawn through pipe tap 66 and by seal 92. It is conceived that snap rings mounted in grooves may be provided and sealing rings carried thereby would provide the desired piston seal of the incoming fluid. These rings are contemplated to be sufficiently larger than diameter 38 to provide the desired return volume through the inlet 66.

The plug 28 is disclosed as a press fit and with the O-ring 91 is contemplated to provide the desired rear seal against the pressurized fluid entering the body through the passageway formed in and through the plug. The preferred securing of this plug is by a cap screw 26 but other means may be provided.

The orientation of the piston by a bolt or cap screw, not shown, is easily achieved by mounting such a screw or bolt in the threaded hole 99. The forming of such a threaded hole is economical and permits and provides ready removal of the bolt after the desired positioning of the piston in the body 20. The screw or bolt is removed after the piston 36 is brought into the desired retaining position and before the plug 28 is mounted in the end of the bore 56.

The body 20 is shown as having its forward end with edges containing the female dovetails 60 and 61. Compatible therewith is jaw 24 and the male dovetail 82 having sloped surfaces 80 and 81. This dovetail assembly is shown as forty-five degrees but a slope as little as thirty and as much as sixty-five degrees may be used. The cam surface 44 on the piston 36 and the mating slope 74 on the jaw 24 may be as little as fifteen degrees and as much as forty-five degrees. The semi-circular cam surface 46 is made at the same slope as the outer cam surface 44 so that the end 78 does not tighten or loosen during actuation. The depicted apparatus has the dovetails disposed at a slope of forty-five degrees to the base surface of the body 20. The angle of inclination of cam surfaces 44 and 46 is about twenty-three degrees to the base surface of the body.

The dovetail assembly shown is the preferred construction but the body may be made with the male portion and the jaw formed with the female configuration. More than one dovetail may be provided and a dovetail shaped as a T-slot or other retaining slidable member may be utilized. It is required that a low friction slide be provided and formed to allow the movable jaw to be moved forwardly and downwardly by the forward movement of the piston. This same piston is adapted to move the jaw up and to the rear to unclamp the work holding jaw.

It is to be further noted that slope 44 as seen in FIG. 11 is a flat cam surface that is usually finished and may have a treated surface to reduce friction. The forming of the semi-circular surface 46 provides sidewall stiffening of the forward cam portions. The several members such as body 20, jaw 24 and piston 36 are preferably of heat treated steel for long life. Screw 26 is also of metal to prevent deformation and splaying. The other components may be materials other than steel and are a matter of personal preference.

The simple and highly effective hold down work-holding clamp of this invention contemplates pressurized air or fluid used with controls are conventional and may be selected to accommodate the desired use. Although the body is usually flat as to its support surface, special applications or conditions may require other shapes and the work body may be made to accommodate such use.

The upper cam surface 46 is shown as formed with a semi-circular finished surface but this is not to preclude a flat or other shape so long as the mating end of the screw is formed to suit the cam surface. The screw 26 is shown as mounted in a threaded aperture but this does not preclude another pin-like member being used. Such an alternative means may be a rivet. The securing of such a pin may be by a securing means such as a set screw or "Dutchman" pin retainer. The preferred forming of the upper cam surface 46 with side walls to strengthen the cam surfaces is shown as a practical matter but this does not dictate that the upper cam surface 46 must have side wall portions. The forward end of the piston is preferably made with lower and upper cam surfaces that are substantially parallel to insure prompt and positive cam actuation of the jaw member 24.

Terms such as "left", "right", "up", "down", "bottom", "top", "front", "back", "in", "out", and the like are applicable to the embodiments shown and described in conjunction with the drawings. These terms are merely for the purposes of description and do not necessarily apply to the position in which the work-holding clamp with double-acting hydraulically actuated jaw may be constructed or used.

While a particular embodiment of the work-holding clamp has been shown and described it is to be understood the invention is not limited thereto and protection is sought to the broadest extent the prior art allows.

What is claimed is:

1. A work-holding clamp adapted for releasably securing a work piece on a table of a machine tool and the like, said work-holding clamp including:

(a) a body member having a supporting surface and means for securing said body member to a work table and with the forward end of said body member formed with a sliding and retaining contoured means disposed at an angle between thirty degrees and sixty-five degrees to the theoretical axis of said body member;

(b) a stepped bore formed in and through said body member and parallel with said supporting surface with a forward end of said bore including a reduced diameter bore portion to and through said forward portion of the body member and into said retaining contour means disposed at this selected angle;

(c) a piston having stepped smaller and larger diameters carried in the stepped bore and movable within said bore by pressurized means such as air or fluid;

(d) sealing means carried by and movable with said piston and adapted to inhibit the passage of the pressurized means beyond said larger diameter;

(e) a fixed sealing means disposed at the forward end of the enlarged portion of said stepped bore, this sealing means disposed to inhibit the flow of that pressurized means between the forward smaller diameter portion of the piston and stepped bore while permitting forward and rearward movement of the piston in the stepped bore;

(f) an inlet passageway through the sidewall of the body member and into the enlarged diameter portion of the stepped bore and with the inner end of said inlet passageway adjacent the fixed sealing means carried in the forward end of the stepped bore;

(g) a fixed plug seal removably mounted in the end of the enlarged bore of the stepped bore and providing therein and therethrough an inlet for pressurized means into the stepped bore and to the rear of the sealing means carried by the piston;

(h) a forward end of the movable piston with a lower cam surface providing an outer and lower angled surface of not less than fifteen degrees and greater than forty-five degrees from the theoretical axis of the piston and a substantially parallel upper cam surface formed at said forward end of the piston;

(i) a jaw member having a compatible sliding and retaining means disposed at an angle similar to that formed and provided at the forward end of the body member, said sliding means disposed for the movement of the jaw member along said retaining means without appreciable deviation of the movement of the jaw member from said angled path and a lower cam surface formed in said jaw member and adapted to engage the lower cam surface formed on the forward end of the piston and with the forward movement of the piston the lower cam surface of the piston engages the lower cam surface formed in the jaw member and urges said jaw member forwardly and downwardly at and along said angled retaining means, and (j) a pin means carried by and in the jaw member and having its inner end adapted to slidably engage the the upper cam surface on the forward end of the piston and with rearward movement of the piston causing the jaw member to be moved rearwardly and upwardly.

2. A work-holding clamp as in claim 1 in which the body member has its supporting surface formed flat for securing said body member to the work table.

3. A work-holding clamp as in claim 2 in which the body member has a rectangular cross section with the forward end of the body member formed at said selected angle to provide the retaining contoured means.

4. A work-holding clamp as in claim 1 in which the retaining contoured means on the forward end of the body member is a female dovetail in which the outer edges of said dovetail are carried on the body member and the jaw member carries a mating male dovetail portion which is integral with and carried by the jaw member and is a sliding fit in the female dovetail of the body member.

5. A work-holding clamp as in claim 1 in which the forward face of the jaw member is made with grooves or serrations which provide positive holding engagement of a work piece.

6. A work-holding clamp as in claim 1 in which the piston is made with major and minor diameter portions, the major diameter portion being the rear portion of the piston and providing front and rear shoulder portion sealing means carried by the piston which includes two sealing rings, one ring carried adjacent the rear of the shoulder portion of the piston and the other ring carried adjacent the front shoulder portion of the piston.

7. A work-holding clamp as in claim 6 in which the piston has its forward end and the lower cam surface smooth finished as a planar and angled surface and the upper cam surface is made as a rounded bottom groove providing sidewall reinforcements along each side of the groove to enhance the strength of lower cam surface.

8. A work-holding clamp as in claim 7 in which the pin means carried in the jaw member is a threaded screw or bolt having its inner end rounded to compatibly engage the rounded bottom groove providing said upper cam surface of the piston and in which the jaw member is formed with a threaded aperture in which the threaded shank of the screw or bolt is adjustably mounted.

9. A work-holding clamp as in claim 1 in which the body member is formed with two through holes and providing a passageway for a shank of a retaining screw passing therethrough to a nut or threaded means carried by the work table.

10. A work-holding clamp as in claim 1 in which the retaining contoured means is disposed at about forty-five degrees to the axis of the piston.

11. A work-holding clamp as in claim 1 in which the cam surface formed at the forward end of the piston is disposed at substantially thirty degrees to the axis of the piston.

12. A work-holding clamp as in claim 1 in which the fixed plug in the rear of said stepped bore is formed with an enlarged outer portion and adjacent to this outer portion are two portions of like and smaller diameters adapted to fit within the larger of said bores and between said like diameters there is a groove sized and adapted to carry an O-ring and with a mounted O-ring providing a seal for and of the pressurized fluid or air past this mounted O-ring.

13. A work-holding clamp as in claim 12 in which the rear fixed plug and said enlarged outward end portion is made with at least one scallop sized and shaped to pass the head of a retaining cap screw, said screw carried in a threaded portion of said body member, the head of said retaining cap screw adapted to seat in and engage this scallop in this plug at the end of the body member and retain this plug in position and orientation.

14. A work-holding clamp as in claim 1 in which the piston is initially provided with material in which are formed forward and rearward centers which allow a precise finishing of the two diameters of the piston after which that material in which the forward center is formed is removed as the outer lower angle cam surface is formed and finished.

15. A work-holding clamp as in claim 14 in which the end of the piston opposite the formed cam end is provided with an integral threaded portion in which is removably mounted a bolt or screw allowing manipulation and orientation of the piston so that the upper and lower cam surfaces formed on the piston may be brought into a mating relationship with those on the jaw member.

16. A work-holding clamp as in claim 1 in which the retaining contoured means provided on the forward end of the body member is a male dovetail and the jaw member carries a mating female dovetail portion which is integral with and carried by the jaw member and is a sliding fit in the male dovetail of the body member.

* * * * *